(12) United States Patent
Delatour

(10) Patent No.: US 7,770,872 B2
(45) Date of Patent: Aug. 10, 2010

(54) FLOW DEVICE FOR AN ENCLOSURE FOR PROCESSING, PARTICULARLY HYDROCARBONS, AND CORRESPONDING ENCLOSURE

(75) Inventor: Romain Delatour, Le Havre (FR)

(73) Assignee: Total Raffinage Marketing, Puteaux (FR)

( * ) Notice: Subject to any disclaimer, the term of this patent is extended or adjusted under 35 U.S.C. 154(b) by 902 days.

(21) Appl. No.: 11/641,815

(22) Filed: Dec. 20, 2006

(65) Prior Publication Data

US 2007/0163871 A1    Jul. 19, 2007

(30) Foreign Application Priority Data

Dec. 22, 2005    (FR) .................................. 05 13153

(51) Int. Cl.
  *B01F 3/04*    (2006.01)
(52) U.S. Cl. ..................... 261/110; 261/114.1; 202/205
(58) Field of Classification Search .................. 261/97, 261/110, 114.1, 114.5; 202/158, 205; 203/91
  See application file for complete search history.

(56) References Cited

U.S. PATENT DOCUMENTS

| | | | | |
|---|---|---|---|---|
| 1,618,099 A | * | 2/1927 | Lombard ................. | 261/112.1 |
| 3,556,737 A | * | 1/1971 | Boyd .......................... | 422/191 |
| 3,598,542 A | * | 8/1971 | Carson et al ................. | 422/191 |
| 3,958,964 A | * | 5/1976 | Koch ............................ | 96/181 |
| 4,226,678 A | | 10/1980 | Mende et al. | |
| 4,689,183 A | * | 8/1987 | Helms et al. .................. | 261/97 |
| 4,729,857 A | * | 3/1988 | Lee et al. ....................... | 261/97 |
| 5,250,234 A | * | 10/1993 | Meyer et al. .................. | 261/97 |
| 5,269,465 A | * | 12/1993 | Zich et al. .................... | 239/193 |
| 5,535,989 A | | 7/1996 | Sen | |
| 6,053,484 A | | 4/2000 | Fan et al. | |
| 6,149,136 A | * | 11/2000 | Armstrong et al. ............ | 261/19 |
| 2005/0035473 A1 | * | 2/2005 | Manteufel ..................... | 261/97 |

FOREIGN PATENT DOCUMENTS

| DE | 764 103 C | 9/1952 |
|---|---|---|
| WO | WO 01/60481 A2 | 8/2001 |

* cited by examiner

*Primary Examiner*—Scott Bushey
(74) *Attorney, Agent, or Firm*—Sughrue Mion, PLLC

(57) ABSTRACT

A flow device intended for a two-phase flow processing enclosure of the natural counter-flow type, in which an ascending gaseous flow and a descending liquid flow circulate. The device is formed by an appreciably horizontal tray having openings for the passage of the ascending gaseous flow, and a channel for recovering the descending liquid flow, the channel discharging into a flow orifice. The flow device includes a single guide device extending beneath the tray and connected to the flow orifice in such a way that the liquid flows on its outer wall. Also, a processing enclosure, particularly for processing a hydrocarbonated or aqueous type liquid flow, containing the flow device.

14 Claims, 2 Drawing Sheets

FLOW DEVICE FOR AN ENCLOSURE FOR PROCESSING, PARTICULARLY HYDROCARBONS, AND CORRESPONDING ENCLOSURE

This application claims priority under 35 U.S.C. §119 from French Patent Application No. 05 13153, the disclosure of which is incorporated by reference herein.

FIELD OF THE INVENTION

The invention relates to a flow device intended for a processing enclosure sheltering a liquid gas flow, usually described as natural counter-flow, i.e., ascending gaseous flow and descending liquid flow. The invention also relates to a processing enclosure provided with such a device.

The flow device according to the invention is more particularly intended for hydrocarbon processing enclosures, including but not limited to atmospheric distillation columns, vacuum distillation columns, visbreaker atmospheric or vacuum fractionation columns.

BACKGROUND OF THE INVENTION

A column of this type is represented in a traditional way in FIG. 1. It includes an enclosure 1 comprising a wash zone A at which a liquid wash flow L is introduced. Beneath the wash zone A there is an overflash zone B, where a two-phase mixture M is introduced, composed of gas and liquid which is separated into an ascending gaseous flow V and a liquid phase L' flowing by gravity toward the lower area of the enclosure. This overflash zone B is provided with a flow device 2 formed from an appreciably horizontal collector tray 3 having openings 4 for the passage of the ascending gaseous flow V and descending liquid flow L. The flow device also comprises a channel 5 for recovering the descending liquid flow L, which channel has a slight slope with respect to the tray. The channel 5 discharges into a flow orifice 6 allowing the flow of the descending liquid flow L to the lower part of the column. This flow orifice 6 is usually connected to an appreciably vertical tubular member 7 (liquid flow draw-off tubular member), inside of which the liquid L flows. The collector tray is provided either with a single channel or multiple channels, each discharging into a single orifice. Because the walls of the tubular member 7 are heated by the ascending gaseous flow, the draw-off liquid flow, flowing inside the tubular member in a thin layer on its internal walls from the flow device 2, is subject to a high temperature during the time of contact (the slower the flow speed, the higher the temperature), which causes the formation of coke on the walls by thermal cracking of the flowing liquid. The accumulation of coke on the internal walls of the tubular member 7 creates a growing obstruction of its passage and ends by causing the blockage thereof, thus requiring the shut-down of the facility. Moreover, the flow descending in a thin film of liquid along the inner walls of the tubular member can be slowed by the ascending gaseous flow, which increases the time the liquid spends on the hot walls of the tubular member and worsens the coking phenomenon.

The coking phenomenon is thus promoted by the heat exchanges between the ascending gaseous flow and the descending liquid flow, said heat exchange increasing as the heat exchanging surface and the time the liquid flow spends in the tubular member are increased. This coking phenomenon is therefore also promoted both by prolonged contact between the ascending gaseous flow and the descending liquid flow, and by prolonged contact between the liquid flow and the inner wall of the tubular member—the slower the speed of the descending liquid flow, the longer the contact.

The coking of this flow device (at the tubular member 7 or the orifice 6) is a serious hindrance, because it not only steadily increases the loss of load of this overflash zone and reduces the hydraulic capacity of the collector tray, it also reduces the cycle times of a facility because it is necessary to shut down the facility prematurely to remove the coke by mechanical means.

Increasing the speed of the film flowing on the inner walls of the tubular member would make it possible to limit the coking phenomenon, because the time the liquid spends on the hot walls of the tubular member would be reduced. One method of increasing this speed would consist of decreasing the diameter of the tubular member. However, such a decrease is contrary to the current development of the technology, which tends to increase the diameter of the tubular member in order to slow as much as possible the blocking of the tubular member due to the formation of coke.

SUMMARY OF THE INVENTION

The invention seeks to overcome these disadvantages by proposing a flow device equipped with a single guiding device making it possible to eliminate or reduce the coking problem, so that it is no longer necessary to shut down the facility in order to unblock the flow device.

In particular, the flow device according to the invention makes it possible both to limit the heat exchange surface as well as to reduce the time of contact between the liquid flow and the guide device. This results in limiting the heat exchange surface and reducing the contact time between the descending liquid flow and the ascending gaseous flow.

Flow devices equipped with guide devices are already known. Thus, the U.S. Pat. No. 5,535,989 document describes a flow device intended for a two-phase flow processing enclosure, particularly of the natural counter-current type, in which an ascending gaseous flow and a descending liquid flow circulate, formed by an appreciably horizontal tray having openings for the passage of the ascending gaseous flow. This tray is provided with at least one orifice for flow of the descending liquid flow, said orifice being provided with a plurality of guide devices located beneath the tray and connected to the flow orifice in such a way that the liquid flows in a film on the guide devices. The liquid thus flows in a continuous film along the guide devices. However, such a system, described as "contactor," is intended to promote the heat exchanges between the liquid flow and gaseous flow by increasing the contact surface between the descending liquid flow and the walls of the guide devices. This results in an increase in the contact time between the two flows. Such a system seeks to multiply the liquid and gas interactions by developing the interface between the liquid flow and the wall of the guide devices, which promotes coking.

On the contrary, the flow device according to the invention makes it possible to concentrate the descending liquid flow at a very limited location in space, and thus to reduce the heat exchange surface between the two flows, as well as their contact time.

The flow device according to the invention is also advantageous when the contact between the descending liquid film and the wall of the enclosure raises any problem of incompatibility between said liquid and the material of said wall, whether the incompatibility be thermal (thermal cracking of the liquid against a hot wall, solidification of the liquid on a cold wall, etc.), mechanical (erosion of the material by a liquid containing abrasive solids), or any problem of corrosion (metallurgy of the material not resistant enough to the corrosive power of the liquid film).

To that end, the object of the invention relates to a flow device intended for a two-phase flow processing enclosure of the natural counter-flow type, in which an ascending gaseous flow and a descending liquid flow circulate, which device is formed by an appreciably horizontal tray having openings for the passage of the ascending gaseous flow, and a channel for recovering the descending liquid flow, the channel discharging into a flow orifice, characterized in that it comprises a single guide device located beneath the tray and connected to the flow orifice in such a way that at least part of the liquid flows on its outer wall.

According to the invention, the liquid flow is far from the walls of the enclosure in which it is intended to be placed. It no longer circulates on the inner walls of the tubular member described above, which then becomes optional, so that there is no risk of blockage by coking of the tubular member or the flow orifice. Furthermore, the fact that the liquid flow is guided by a single guide device allows a continuous flow through a passage with a smaller cross section (flow orifice), and therefore a speed of flow that is higher than when the flow takes place as a thin layer on the wall of the tubular member, or higher than if the flow occurred freely in the enclosure, which can also improve the quality of the liquid/gas interface and limit the phenomenon of carry-over of droplets of liquid by the ascending gaseous flow (an anti-natural counter-current two-phase flow in which the gaseous phase carries the liquid upward). By increasing the speed of flow of the liquid, the time of contact between the liquid flow and gaseous flow is reduced, thus reducing coking. Finally, such a guide also makes it possible to reduce the heat exchange surface between the two flows, which reduces coking.

According to the invention, the guide device can be composed of a chain, a tube, a spring with non-contiguous turns, or a tube surrounded by a spring with non-contiguous turns.

In one particular variation, when the device is composed of a tube, possibly surrounded by a spring, the interior of the tube can be provided with a heating or cooling element. For example, this can be a heating wire or the circulation of a heat-transfer fluid. This arrangement makes it possible to cool the liquid flow in order to avoid the undesirable reactions, or to heat it in order to make the liquid flow less viscous and thus accelerate its rate of flow.

In yet another variation, the guide device can be surrounded by a tubular member of larger diameter allowing the liquid flowing along the guide device to be isolated from the enclosure, or the heat exchanges between the liquid flow and the enclosure to be controlled. In this case, the device allows the formation of coke in the tubular member to be slowed down, because the liquid flow remains separated from the hot wall of the tubular member.

Preferably, the guide device has a transverse cross section that is small enough compared to the cross section of the flow orifice or of the tubular member that surrounds the guide device, to keep the liquid flowing along the device separated from the walls of the enclosure or tubular member.

This cross section is small enough to limit the contact and heat exchange surface between the two flows, which reduces coking.

Advantageously, the guide device has a transverse cross section of between 1/5th and about one half the transverse cross section of the flow orifice or of the tubular member that surrounds the guide device.

Preferably, the guide device is made of a material suitable for the characteristics of the liquid flow.

The invention also relates to a two-phase flow processing enclosure of the natural counter-current type, characterized in that it includes at least a flow device according to the invention.

Advantageously, the guide device extends along an axis appreciably parallel to the vertical axis of the enclosure. The liquid then flows in a thin layer on the outer wall of the guide device, appreciably parallel to the wall of the enclosure and at an appreciably constant distance therefrom. In this position, nearly the entirety of the liquid flows by gravity on the outer walls of the guide device.

In a particular form of embodiment, the end of the guide device opposite the flow orifice is attached to the enclosure. Said attachment is mechanical and can be located in the lower area of the enclosure.

More particularly, the enclosure according to the invention is intended for processing a hydrocarbonated or aqueous type liquid flow.

This involves, for example, the particular case of an atmospheric distillation column, crude oil vacuum distillation column, visbreaker atmospheric or vacuum fractionation column.

BRIEF DESCRIPTION OF THE DRAWINGS

The invention is now described with reference to the attached non-limiting drawings, in which.

DETAILED DESCRIPTION OF PREFERRED EMBODIMENTS

Figure 1:
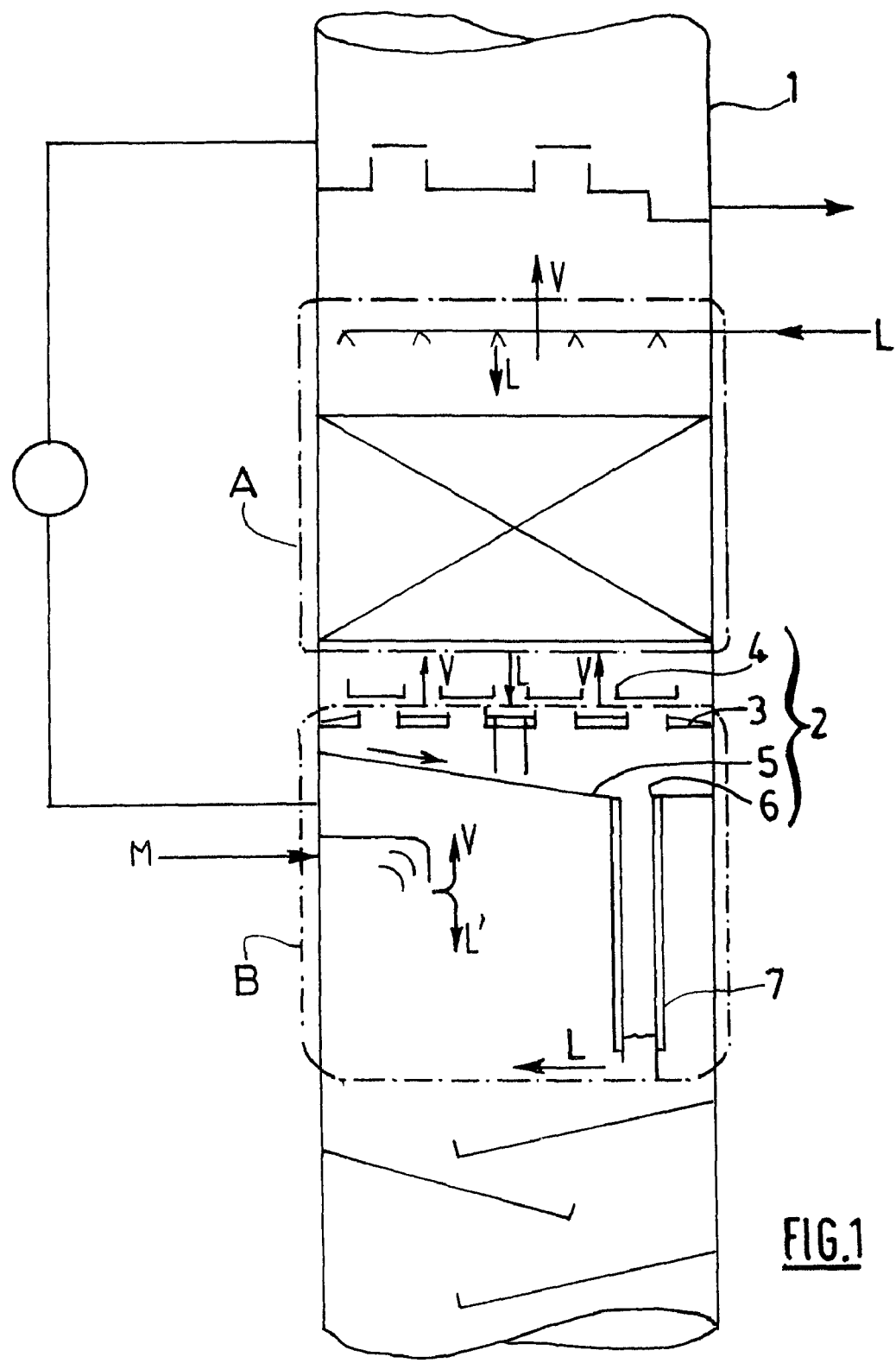
FIG. 1 is a traditional representation of an enclosure for the natural counter-current two-phase flow processing.
Figure 2:
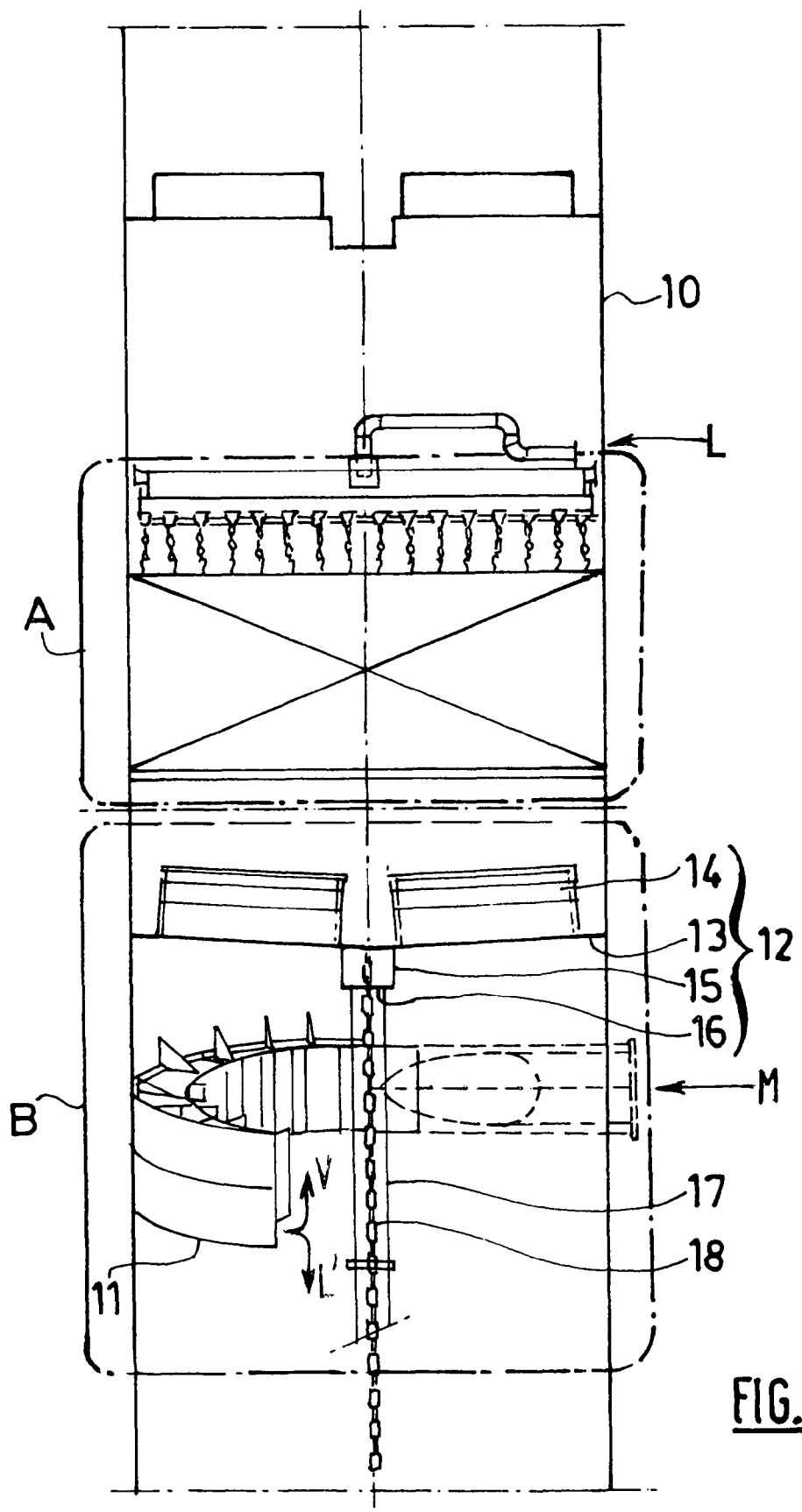
FIG. 2 represents a visbreaker vacuum distillation column equipped with a flow device according to the invention.

The vacuum distillation column represented in FIG. 2 comprises a natural counter-current two-phase flow processing enclosure 10, in which a descending liquid flow L in dynamic movement and an ascending gaseous flow V circulate. This enclosure 10 is intended for the processing of a hydrocarbonated or aqueous type liquid flow.

The enclosure 10 has a wash zone A located above an overflash zone B. A descending liquid flow L is introduced at the wash zone A, while a two-phase gas/liquid mixture M is introduced at the overflash zone B by means of a load distributor 11. The two-phase flow M is then separated into an ascending gaseous flow V and a liquid L' flowing by gravity toward the lower area of the enclosure.

This enclosure 10 includes a flow device 12 according to the invention, formed by an appreciably horizontal collector tray 13 comprising openings 14 for the passage of the ascending gaseous flow V, and a recovery channel 15 for the descending liquid flow L. In the example shown, the openings 14 are presented in the form of chimneys.

The channel 15 discharges into a flow orifice 16 to which a single appreciably vertical tubular member 17 is connected. This tubular member 17, for example, is similar to tubular members normally used, and is connected at the flow orifice.

The flow device 12 according to the invention comprises a single guide device 18 extending beneath the tray along the axis of flow of the liquid flow, inside the tubular member 17. Thus the axis of flow of the liquid flow L coincides with the axis of the tubular member 17 and is parallel to the vertical axis of the enclosure 10.

This guide device 18 is connected to the flow orifice 16 by any removable or permanent mechanical means, in such a way that the liquid L flows on its outer wall. In the example represented, because the guide device is parallel to the axis of the enclosure, the liquid flows on the outer walls of the device parallel to the wall of the enclosure. The liquid thus flows on the guide device at a constant distance from the wall of the tubular member 17 (or of the enclosure when the tubular member 17 is eliminated).

The guide device 18 can be attached either to the center of the flow orifice 16 by appropriate means, or to an edge of said orifice, preferably on the side where the liquid flow from the channel 15 preferentially flows.

When the guide device is attached to the center of the orifice 16, the tubular member 17 can have the same diameter as the flow orifice 16. Because of its speed, the liquid from the channel 15 then falls at the center of the tubular member, onto the guide device.

When the guide device is attached to an edge of the flow orifice, the tubular member 17 preferably has a diameter greater than the diameter of the flow orifice 16, so that the liquid flows along the chain and not on the inner walls of the tubular member.

In this example, the guide device is a chain 18, the transverse cross section of which is small enough compared to the cross section of the tubular member 17 to maintain the flow of liquid along the device at a distance from the inner walls of the tubular member.

This transverse cross section is preferably between $1/5$th and about one half the transverse cross section of the tubular member 17 or of the flow orifice 16.

According to the ratio between the cross section of the tubular member or of the flow orifice and the cross section of the enclosure, the transverse cross section of the guide device can be between about $1/10$th and about $1/20$th of the transverse cross section of the enclosure.

The chain 18 is made of a material suitable for the characteristics of the liquid flow.

In order to prevent the chain from touching the walls of the tubular member 17, due to turbulences related to the hydrodynamics of the liquid and gas flows, which could occur if the chain is not enough heavy, the lower end of the chain (away from the flow device) can be attached to the enclosure 10.

Moreover, if the tubular member 17 is not mounted strictly vertical, the chain can be attached by its lower end to prevent it from touching the wall of the tubular member. Depending on the slope of the chain and the nature of the liquid flow, part of the liquid flow can be detached from the chain and fall by gravity, while the other part flows in a thin layer along the chain.

In a variation not shown, the chain can be replaced by a tube that can have any cross section (square, round, triangular, elliptical, helical, etc.). The upper end of the tube is preferably closed so that the liquid flow can only flow on the outer wall of the tube. The interior of said tube can also be equipped with a heating or cooling element.

The guide device can also be composed of a spring with non-contiguous turns, or a tube surrounded by a spring with non-contiguous turns.

In another variation not shown, the tubular member 17 connected to the tray and inside which the guide device is placed, is eliminated.

The different variations described above can be combined with each other.

The invention claimed is:

1. A flow device for a two-phase flow processing enclosure of the natural counter-flow type, in which an ascending gaseous flow and a descending liquid flow circulate, comprising an appreciably horizontal tray having openings for the passage of the ascending gaseous flow, and a channel for recovering the descending liquid flow, the channel discharging into a flow orifice, and further comprising a single guide device extending beneath the tray and connected to the flow orifice in such a way that at least part of the liquid flows on its outer wall.

2. The flow device according to claim 1, wherein the guide device comprises a chain.

3. The flow device according to claim 1, wherein the guide device comprises a tube.

4. The flow device according to claim 1, wherein the guide device comprises a spring with non-contiguous turns, or a tube surrounded by a spring with non-contiguous turns.

5. The flow device according to claim 3 or 4, wherein the interior of the tube is equipped with a heating or cooling element.

6. The flow device according to claim 1, wherein the guide device is surrounded by a tubular member.

7. The flow device according to claim 1, wherein the guide device comprises a transverse cross section small enough compared to the cross section of the flow orifice, or of a tubular member that surrounds the guide device, to keep the liquid flowing along the device at a distance from the walls of the enclosure or the tubular member.

8. The flow device according to claim 7, wherein the guide device comprises a transverse cross section of between $1/5$th and about one half of the transverse cross section of the flow orifice or of the tubular member that surrounds it.

9. The flow device according to claim 1, wherein the guide device is made of a material suitable for the characteristics of the liquid flow.

10. Two-phase flow processing enclosure of the natural counter-current type, comprising a flow device according to claim 1.

11. The processing enclosure according to claim 10, wherein the guide device extends appreciably parallel to the vertical axis of the enclosure.

12. The processing enclosure according to claim 10 or 11, wherein the end of the guide device opposite to the flow orifice is attached to the enclosure.

13. The processing enclosure according to claim 10, wherein it is intended for the processing of a hydrocarbonated or aqueous type liquid flow.

14. The processing enclosure according to claim 10, wherein it relates to a crude oil atmospheric or vacuum distillation column, vacuum distillation column, visbreaker atmospheric or vacuum fractionation column.

* * * * *